United States Patent Office 3,263,889
Patented August 2, 1966

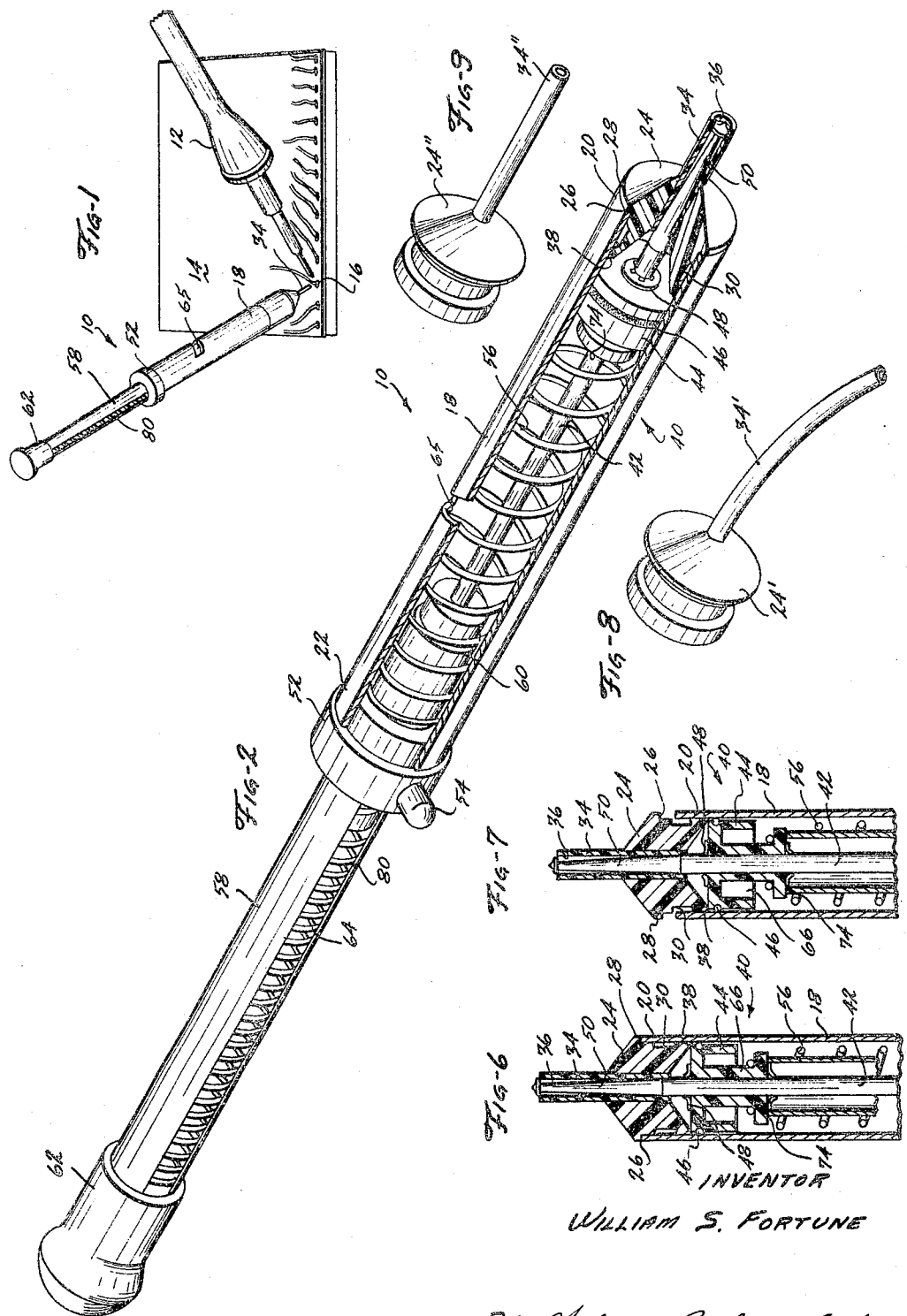

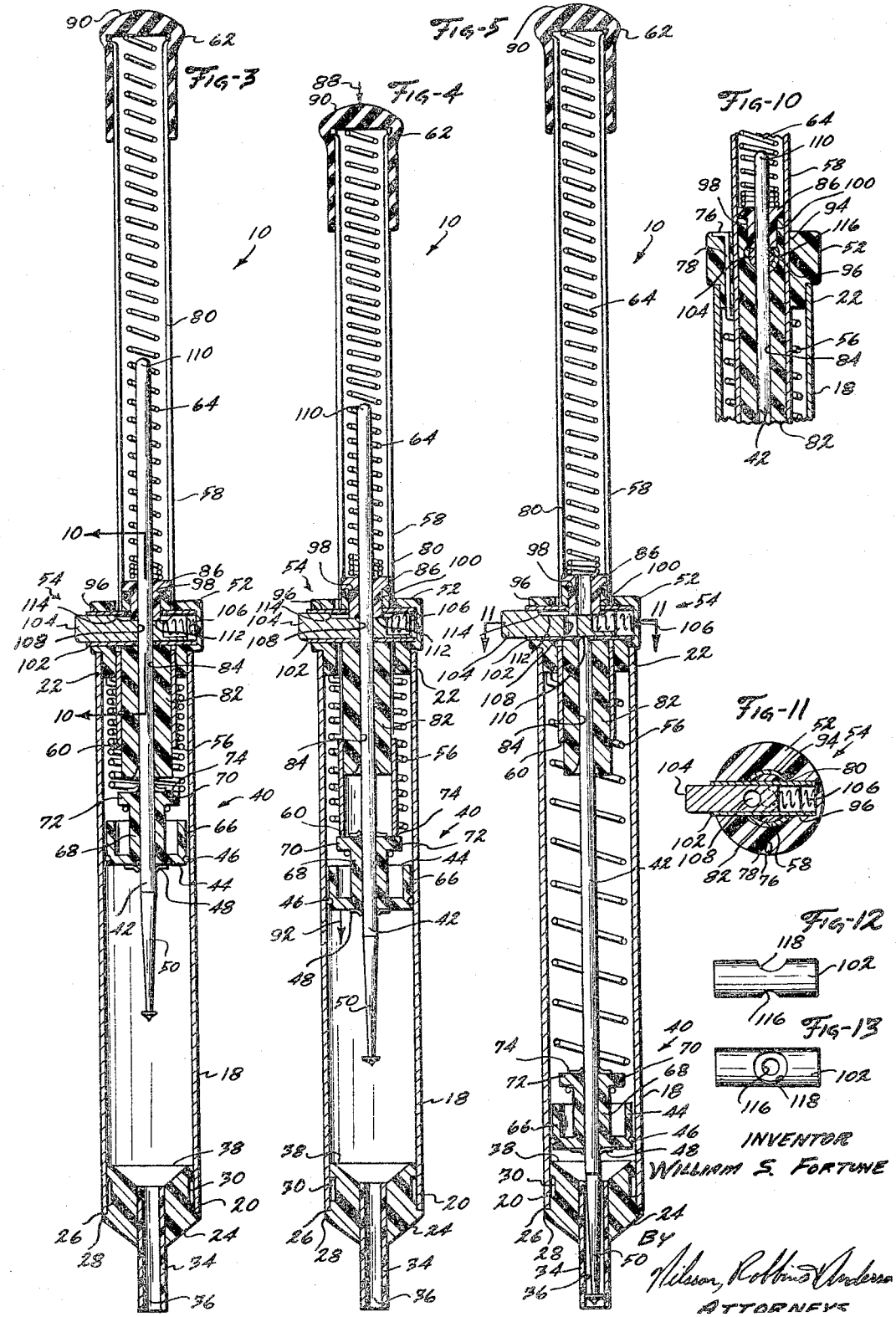

3,263,889
SOLDER REMOVAL APPARATUS
William S. Fortune, 14100 Jouett St., Pacoima, Calif.
Filed Oct. 9, 1964, Ser. No. 402,729
7 Claims. (Cl. 228—20)

This invention relates generally to electronic circuits and electric equipment repair, salvage, and rebuilding. In particular the present invention relates to the removing of molten solder from electrical connections and constitutes, in part, certain improvements relating to the invention specified in United States Patent No. 3,114,026 issued to the present applicant on December 10, 1963.

In modern electronic manufacturing facilities and particularly so in research and development laboratories, it is routinely required that small electronic components such as resistors, capacitors, transistors and the like, be removed from terminal strips or printed circuit boards and salvaged for subsequent rebuilding. Frequently the solder connection is not only the means for securing an electrical connector, but is also used to form or secure a structural supporting connection for the component. To this end the lead wires of a component are typically wrapped around the terminal post and then the wound post is more or less covered with solder. Unless the solder is removed, it is then difficult or substantially impossible to unwind the lead from the post and remove the component without incurring a high risk of damage to the circuit board or terminal post or the component itself. Heating the connection and melting the solder does not provide a satisfactory method of removing in that normally, the high surface tension of the solder causes it to remain in place on the post even though it is otherwise in a mobile state. In some cases the solder can be caused to flow away from the joint by continuing to heat it so that effectively the surface tension of the molten solder is reduced, however, this may cause damage to the circuit board or to the component, and if the solder does flow it may flow to an undesired location with respect to the circuit board or its components. In some cases the solder remaining in place even through molten, it soludifies with the aid of gravity, provided it is possible to place the soldering iron below the connection, however, such an orientation is usually totally impractical to achieve.

It is possible, usually, to melt the solder and then blow it away while it is still molten, however, this at best does not remove all the solder and it is always apt to spatter the solder where it is not wanted and to create bits of solder which may at a later time, be jarred or vibrated into a position deleterious to the proper operation of the circuit, as for example, by causing an undesired short circuit.

The general problem of removing soldered connections is inherently aggravated by the fact that in addition to the solder remaining in place even though molten, it solidifies extremely quickly when a cold tool is applied to unwind and remove the wrapped lead.

Certain aspects of the problem have been successfully solved by the development in recent years of the solder removing hollow tube extending therethrough, and above specified patent. The apparatus therein disclosed includes a small hand-held thin walled cylinder which houses a spring-loaded vacuum producing piston. The piston is connected to an axial shaft which passes through a bushing assembly at the top end of the cylinder, and is terminated by a knob. The bushing end of the cylinder also includes a trigger means which cooperates with the shaft in a manner to hold the piston, against the spring force, near the opposite end of the cylinder until the trigger is depressed. This opposite end of the cylinder is substantially closed by a tip member having a solder removing hollowing tube extending therethrough, and which in operation is placed near the molten solder to be removed. When the trigger is depressed the piston is forced by the spring quickly to the upper end of the cylinder and the resulting vacuum draws the molten solder into the cylinder through the hollow tube of the tip member. For a subsequent vacuum stroke the piston is again forced to the tip end by hand force applied to the knob, and held there until the trigger mechanism is actuated.

As indicated above, these devices have advanced the state of the art, and have in large measure solved certain portions of the problem outlined; however, they suffer for some applications, disadvantages due to the fly-back action of the piston-shaft-knob assembly during the vacuum stroke. The shaft which connects the spring loaded piston to the cocking knob must be heavy and strong enough to cock the loading spring and the knob must be large enough and soft enough for convenient repeated cocking by the operator. These factors cause the piston-shaft-knob assembly to have considerable mass compared to the light weight cylinder housing. Accordingly, when the trigger is depressed and the piston assembly flies back, the outer housing suffers a recoil action causing a deflection of the tip from the location of the molten solder.

Another disadvantage of the fly-back associated with the knob and shaft is that typically the operator places his head near the tool during the vacuum stroke and his eye can easily be damaged if struck by the cocking knob.

Accordingly, it is an object of the present invention to provide a means and method for removing molten solder from objects to which it has become adhered, which are not subject to these and other disadvantages of the prior art.

It is another object to provide such a remover which may be particularly adapted to remove molten solder from electrical connections as on a circuit board or small post on a terminal strip.

It is another object to provide such a remover which is a small lightweight hand-held integral tool.

It is another object to provide such a remover which is simple in construction, rugged, dependable, has a long life and is inexpensive to manufacture.

It is another object to provide such a remover which is easily cleaned and maintained.

It is another object to provide such a remover which does not scatter or splash or otherwise disperse the molten solder.

It is another object to provide such a remover which flash hardens any remaining trace of solder thereby rendering it into a weak crystalline form so as to minimize its bonding strength.

It is another object to provide such a solder remover the inertia of whose parts which move during the vacuum producing stroke is exceedingly small thereby minimizing any deflection of the solder removing tip during the vacuum stroke of the apparatus.

It is another object to provide such a solder remover in which the cocking mechanism does not move during the vacuum stroke.

Briefly, these and other objects are achieved in an example of the present invention which includes a thin walled, ¾-inch diameter aluminum cylinder, the length of which is of the order of 5 inches. Within the cylinder is housed a piston mounted on a lightweight aligning shaft which projects through a bushing interior assembly mounted at the rear of the cylinder.

A tension spring is coupled within the cylinder between the piston and the bushing assembly which tends to force the piston away from the opposite, solder removing tip end.

A hollow loading shaft also passes through the bushing assembly and engages the rear skirt or the piston. The exposed end of the loading shaft is capped with a resilient cocking knob, and a relatively weak return spring is compressively retained within the hollow loading shaft between its knob end and the bushing assembly.

In operation, the loading shaft is pushed into the cylinder forcing the piston toward the tip end until the end of its alignment shaft is engaged by the trigger mechanism in the bushing assembly. The loading shaft is then released and returned to its extended position by the return spring. The tip may then be placed near the molten solder to be removed. The trigger mechanism may then be actuated when desired to cause the release of the alignment shaft and the fly-back of the piston.

During this vacuum stroke it should be noted that the only moving parts are the piston and its aligning shaft and, of course, portions of the tension spring. The result is a smooth, substantially recoilless action, and the operator's eye is not endangered by any motion of the loading shaft.

Further details of these and other novel features such as the trigger mechanism and tip assembly and their operation as well as additional objects and advantages of the present invention will become apparent and be best understood from a consideration of the following description taken in connection with the accompanying drawings which are presented by way of illustrative example only and in which:

FIG. 1 is an overall perspective view illustrating the use of an example of the solder removal apparatus of the present invention in cooperation with a soldering iron and circuit board;

FIG. 2 is a perspective view partially cut away to illustrate internal structural relationships of an example of a solder removal tool constructed in accordance with the principles of the present invention;

FIG. 3, FIG. 4, and FIG. 5 are longitudinal sectional views of the apparatus shown in perspective in FIG. 2, illustrating internal details of structure and their cooperative relationships during operation of the invention;

FIG. 10 is a longitudinal sectional view of a portion of the structure of FIG. 3, FIG. 4, and FIG. 5, taken along the lines 10—10 of FIG. 3;

FIG. 11 is a cross-sectional view of a portion of the apparatus of FIG. 3, FIG. 4, FIG. 5, taken along the lines 11—11 of FIG. 5;

FIG. 12 and FIG. 13 are longitudinal orthogonal elevational views of a transversely apertured sleeve member shown in section in the previous figures;

FIG. 6 and FIG. 7 are longitudinal sectional views of the tip end portion of the apparatus illustrated in the previous figures, included for purposes of illustrating the method of removing the tip assembly from the remainder of the apparatus; and FIG. 8 and FIG. 9 are perspective views of tip member configurations which are alternative to those illustrated in the previous figures.

With specific reference now to the figures in detail, it is stressed that the particulars shown are by way of example and for purposes of illustrative discussion only, and are presented in the cause of providing what is believed to be the most useful and readily understood description of the principles and structural concepts of the invention. In this regard, no attempt is made to show structural details of the apparatus in more detail than is necessary for a fundamental understanding of the invention, the description taken with the drawings making apparent to those skilled in the art how the several forms of the invention may be embodied in practice.

Specifically, the detailed showing is not to be taken as a limitation upon the scope of the invention which is defined by the appended claims forming, along with the drawings, a part of this specification.

An example of the solder removal tool 10 is shown in FIG. 1 in a pictorial illustration of a typical utilization of the tool in cooperation with a conventional soldering iron 12, both being illustrated in the proximity of a circuit board 14 having a plurality of solder connections 16 applied thereto. In overall operation when one or more of the solder connections 16 is to be removed or "desoldered," it is melted by application thereto of the hot tip of the soldering iron 12 and then removed by the action of the solder removal tool 10.

Referring to FIG. 2, the major components of the tool 10 are illustrated in a partially broken away perspective representation. The tool 10 in this example, includes a thin-walled hollow cylindrical housing body 18 having a tip end 20 and a bushing housing end 22. Disposed slidingly within the tip end 20 is shown an axially ported tip member 24 having an annular retaining shoulder 26 formed by an enlarged diameter portion 28 and a reduced diameter portion 30 which extends with a frictionally holding relation into the tip end 20 of the cylindrical housing body 18, the diameters of the enlarged and reduced diameter portions of the tip member 24 being substantially equal respectively to the outer and inner diameters of the thin-walled cylindrical housing body 18. The tip member may also include a tube member 34 having a central bore which extends coaxially with the housing body 18 through the tip member 24 to define a solder drawing channel 36 which communicates between the interior volume of the housing body 18 and the external atmosphere. The rear surface of the tip member 24 includes a piston engaging shoulder 38 which is utilized as described below, for purposes of ejecting the tip member from the housing body 18. Further details of this and alternative tip members and their operation and removal from the housing body 18 are discussed below in connection with subsequent figures.

Also disposed within the housing body 18 is a piston assembly 40 which includes an elongated alignment rod 42, a piston member 44, a piston ring formed by an O-ring 46, a pair of retainer nuts 48, one only shown in this view, and a channel cleaning extension 50 of the alignment rod 42 which extension protrudes forwardly from the piston member 44 into and through the solder drawing channel 36. The opposite end of the alignment rod 42 extends into and partially through a bushing housing or bushing support member 52 disposed within the bushing housing end 22 of the cylindrical housing body 18. The entire piston assembly 40 is in this example, made of low mass materials, such as Teflon for the piston member 44 and aluminum for the rod 42 and its extension 50. The rear end of the alignment rod 42 may be engaged, as described more fully below, by a trigger mechanism 54 which holds the piston assembly 40 in its position as shown contiguously to the tip end 20 of the housing body 18 against the tension force of a vacuum stroke producing mainspring 56, the latter being connected at its opposite ends to the bushing housing member 52 and the rear portion of the piston member 44.

A cocking plunger member 58 which is cooperatively slotted for the passage therethrough laterally of the trigger mechanism 54, also passes through the bushing housing member 52 and is terminated at its forward end with a piston engaging shoulder 60.

The cocking plunger member 58 is actuated through hand force applied to the handle portion 62 thereof, to drive the plunger member axially inwardly through the apertured bushing housing member 52 in a manner to drive by its engagement, not shown, with the rear surface of the piston member 44, the piston assembly toward the tip end 20 until the rear end of the alignment rod 42 is placed in a holding relationship by the trigger mechanism 54. The cocking plunger member 58 is then returned axially outwardly by the action of a return spring 64 which is compressively retained between the handle portion end of the plunger member and the bushing housing member 52.

When the trigger mechanism 54 is actuated, the piston assembly is permitted to fly back by forcing air within the body 18 out through an exhaust port 65. It may be noted that air trapped between the port 65 and the member 52 forms a pneumatic cushion for the piston assembly at the end of its vacuum stroke thusly further minimizing the deflection of the tip 24 from the work.

Referring to FIG. 3, FIG. 4, and FIG. 5, the solder removal tool 10 of the previous figures is shown in more detail and in three different states of operation of the cocking and trigger mechanism. In FIG. 3, the piston assembly 40 is shown at rest in its rearward position with the cocking plunger member 58 in its fully outwardly extended position. In FIG. 4 the apparatus is shown midway in the process of being cocked, while in FIG. 5 the piston assembly is shown fully cocked with the cocking plunger returned to its fully extended position.

With particular reference to FIG. 3, certain of the structural aspects and details of the apparatus are shown and will here be described, in more detail than in connection with the previous figures. The thin-walled cylindrical housing body 18 is again illustrated with the tip member 24 disposed within the tip end 20. The alignment rod 42 with its forwardly extending channel cleaning extension 50 is shown axially affixed to the piston member 44 by means of the pair of retainer nuts 48. The piston sealing O-ring 46 is held to and carried by the piston member 44 by an annular retaining channel 66 formed about the cylindrical periphery thereof. The rearwardly extending central portion 68 of the piston member 40 is terminated by an enlarged diameter portion 70 which forms a tension spring end retaining shoulder 72. Approximately one turn at the end of the mainspring 56 is encircled about the central portion 68 just forwardly of the enlarged diameter portion 70 and, as shown, the annular channel formed forwardly of the retaining shoulder 72 has an axial dimension which is longer than the diameter of the wire of the spring 56 thereby to permit a limited freedom of motion of the end turn of the spring 56 therewithin to minimize any recoil or other impulse forces during the vacuum stroke of the tool 10. The opposite end 76 of the spring 56 is held by a retaining aperture 78 formed in the side portion of bushing housing member 52.

The rear surface of the enlarged diameter portion 70 forms a cocking plunger engaging surface 74. Note that the cocking plunger member 58 is formed in this example from a length of hollow metallic tubing which is provided with a pair of axially elongated trigger clearing slots 80 (see FIG. 2), the operation of which will be described below.

Retained by the trigger mechanism 54 and the bushing housing member 52 and disposed concentrically within the cocking plunger member 58 is an alignment member 82 which is axially ported by a bore 84 which slidingly receives the alignment rod 42 of the piston assembly 40. Also retained within the cocking plunger member 58 is a trigger retaining plug 86 which is also bored axially to receive the alignment rod 42 and the upper surface of which forms an engaging surface for the end of the return spring 64. Thusly, it may be seen that the return spring 64 is retained compressively between the trigger retaining plug 86 and the handle portion 62 of the cocking plunger member 58.

In operation, see FIG. 4, hand force indicated by the arrow 88 is applied to the upper surface 90 of the handle portion 62 causing the return spring 64 to be compressed and the opposite end of the cocking plunger member to engage the cocking plunger engaging surface 74 of the piston member 44 causing the entire piston assembly 40 to move downwardly toward the tip end 20 as indicated by the displacement arrow 92.

Referring to FIG. 5, the piston assembly 40 is shown fully extended toward the tip end 20 where it is held by virtue of the engagement of the top end of the alignment rod 42 by the trigger mechanism housed within the bushing housing member 52. The cocking plunger member 58 may then be released and consequently returned to its fully extended position, as shown, by the operation of the return spring 64. The tool 10 is then in a cocked or loaded state and ready for its vacuum producing stroke which may occur at any time that the trigger mechanism is actuated to release the end of the aligning rod 42 permitting the piston assembly 40 to fly back to its position shown in FIG. 3. It may be noted, with reference to FIG. 6, that when the piston assembly 40 is pushed downwardly beyond its position shown in FIG. 5, the channel cleaning extension 50 of the aligning rod 42 will clear the entire length of the solder drawing channel 36. Furthermore, see FIG. 7, when the piston assembly 40 is displaced even further toward the tip end 20, the piston member 44 engages the rear surface of the solder drawing tip member 24 at the piston engaging shoulder 38 thereof; and, with additional force applied as indicated by the force arrow 88, the tip member 24 may be ejected from the tip end 20 of the housing body 18 as for purposes of replacing the tip, for cleaning the interior cylindrical surfaces of the housing body 18, and for applying lubrication to the piston engaging walls of the housing body.

Referring to FIG. 8 and FIG. 9, alternative examples of the tip members 24' and 24" are illustrated which may be substantially similar to the tip member 24 of the previous figures except that the tube members 34' and 34" are, respectively, in these examples more elongated, curved, or flexible for purposes of desoldering in terminal locations which would not be conveniently accessible with the solder drawing tip 34 of the previous examples.

Referring to FIG. 10, some of the details of the structure in the region of the bushing housing end 22 of this example, of the solder removal tool are illustrated. The bushing housing member 52 is shown retained within the end 22 of the housing body 18 in a press fit relationship or by a retaining screw, not shown. The bushing member 52 is provided with a bore 94 which slidingly receives the cocking plunger member 58. A transverse bore 96 is also provided through the member 52 for purposes of retaining and housing the trigger mechanism 54, as shown below. The relationship of the trigger clearing slots 80 of the plunger member 58 with respect to the trigger mechanism 54 is indicated in this view. Similarly, the retaining aperture 78 for securing the spring end 76 is illustrated more fully in this view.

Disclosed concentrically within the plunger member 58 is the alignment member 82 which would be free to slide axially with respect to the bushing housing member 52 but for its holding relationship with the trigger mechanism 54. The trigger mechanism 54, as shown more fully below, is in turn retained within the assembly by the trigger retaining plug 86, a reduced diameter portion 98 of which extends axially into the member 82 into engagement with the trigger mechanism 54 through an enlarged bore 100 in the end of the alignment member 82. The alignment rod 42 of the piston assembly is shown in place concentrically within the remaining structure at the bushing housing end 22 of the housing body 18. It may also be noted that the trigger retaining plug 86 is retained in engagement with the trigger mechanism 54 through the action of the return spring 64 which, as pointed out previously, is, in this example, in a state of compression.

Referring to FIG. 11, the trigger mechanism 54 is shown in more detail as including the transverse bore 96 within which is placed a metallic trigger sleeve member 102. Within the sleeve member 102 is disposed a trigger cylinder member 104 which is urged outwardly by a trigger spring 106 which is held in compression between the trigger cylinder 104 and the bottom of the transverse bore 96. The trigger cylinder member 104 is provided with an alignment rod receiving aperture 108 through which the alignment rod 42 of the piston assembly normally passes. In this state of operation, of the invention illustrated in FIG. 5 and FIG. 11, however, the alignment rod 42 has been displaced toward the tip end 20 of the housing body 18 sufficiently to permit the spring 106 to push the trigger cylinder 104 outwardly so that the rod receiving aperture 108 is no longer aligned with the rod 42. The rod is then held in its extended position against the tension of the mainspring 56 by engagement of the end 110 of the alignment rod by the bottom surface of the trigger cylinder 104 as shown particularly in FIG. 5.

A portion of the upper cylindrical surface of the trigger cylinder 104 is relieved to form a flat surface 112 for engaging the bottom end of the trigger retaining plug 86. This flattened surface 112 of the trigger cylinder 104 extends for a short distance along the length of the cylinder 104 from the alignment rod receiving aperture 108 and the ends of the flattened surface 112 form stopping shoulders 114 which engage the bottom portion of the trigger retaining plug 86. The engagement of the flattened surface 112 by the bottom of the trigger retaining plug 86, therefore, not only retains the trigger cylinder 104 within the trigger sleeve member 102, but also holds the cylinder member 104 from rotating within the sleeve so that at all times the aperture 108 is aligned in the axial direction and will receive the alignment rod 42 whenever the cylinder member 104 is urged, as by the thumb of the user, against the spring 106 whereby the aperture 108 is aligned with the rod 42.

Referring to FIG. 12 and FIG. 13, the trigger sleeve 102 is shown as having a transverse aperture 116 provided therethrough for receiving the alignment rod 42 and, coaxially therewith, an aperture 118 is provided through one cylindrical wall thereof for receiving the reduced diameter portion 98 of the trigger retaining plug 86.

In operation, the cocking plunger member 58, with its trigger clearing slots 80 providing clearance for the sleeve member 102, is forced downwardly or inwardly with respect to the housing body 18 until the alignment rod 42 passes through and beyond the aperture 108 in the trigger sleeve member 104. The action of the trigger spring 106 then urges the cylinder 104 outwardly until one of the stopping shoulders 114 engages the bottom portion of the trigger retaining plug 86. The cocking plunger member 58 may then be released or returned to its position illustrated in FIG. 5, while the tip end 110 of the alignment rod 42 is engaged in a piston holding engagement with the under cylindrical surface of the trigger cylinder member 104. The apparatus will remain in this state of operation until the trigger cylinder member 104 is depressed inwardly until the aperture 108 becomes aligned with the alignment rod 42 of the piston assembly at which point in time, the piston assembly will be permitted to fly back due to the tension in the mainspring 56. During this vacuum stroke portion of the operation of the solder removal tool, it will be appreciated that the only moving portions of the apparatus are the low inertia piston member 44, the alignment rod 42, and an indeterminate portion of the mainspring 56. Thusly, when the trigger cylinder 104 is initially depressed, there is no significant jerking displacement of the solder tube member 34; and, similarly, when the spring is relaxed as in its state shown in FIG. 3, there is no significant impulse imparted to the apparatus.

There has thus been disclosed an example of a solder removing tool which achieves the objects and exhibits the advantages set forth and discussed hereinbefore.

What is claimed is:
1. Solder removing apparatus comprising:
thin walled hollow cylindrical body member having tip and bushing ends;
piston assembly including a piston member and an alignment shaft member coupled thereto, the piston member being disposed in said cylindrical body member and adapted for axial movement therealong;
vacuum stroke producing spring means disposed within said body member and coupled to said piston member for urging it toward said bushing end;
bushing supporting means disposed contiguously to and in a partially closing relation with said bushing end and defining an axial aperture therealong, said alignment shaft member being disposed therethrough;
piston cocking shaft means extending with axial freedom of movement through said aperture and having a piston member engaging end disposed within said body member and an external end disposed outside thereof;
return spring means disposed axially compressively between said external and piston engaging end of said cocking shaft means; and
trigger means actuable externally of and carried by said body member in abruptly releasable engagement relationship with said piston assembly for holding said piston member toward said tip end against the axial force of said vacuum stroke producing spring means.

2. Solder removing apparatus comprising:
thin walled hollow cylindrical body member having tip and bushing ends;
piston assembly including:
a piston member disposed in said cylindrical body member and adapted for axial movement therealong, and
an alignment shaft member affixed to said piston member and extending coaxially therefrom toward said bushing end;
vacuum stroke producing spring means disposed within said body member and coupled to said piston member for urging it toward said bushing end;
bushing supporting means disposed contiguously to and in a partially closing relation with said bushing end and defining an axial aperture therealong, said alignment shaft member being disposed therethrough;
piston cocking shaft means extending with axial freedom of movement through said aperture and having a piston member engaging end disposed within said body member and an external end disposed outside thereof;
return spring means disposed axially compressively between said external and piston engaging end of said cocking shaft means; and
trigger means actuable externally of and carried by said body member in abruptly releasable engagement relationship with said piston assembly for holding said piston member toward said tip end against the axial force of said vacuum stroke producing spring means,
the relationship of the axial length of said housing body, said alignment shaft member, and said cocking shaft means being selected so that permitted axial motion of the latter toward said tip end until said piston member is disposed contiguously thereto does not totally remove said alignment shaft member from said aperture.

3. The invention according to claim 2 in which said vacuum stroke producing spring means includes a tension supporting spring disposed between said piston member and said bushing supporting means and in which said piston member and said bushing supporting means each include spring end securing means for coupling said spring thereto in tension supporting manner therebetween.

4. The invention according to claim 2 in which said trigger means comprises a trigger shaft member disposed substantially diametrically transversely through at least a portion of said bushing supporting means and extending radially through said axial aperture and terminating with an actuator surface externally of said bushing support means, said trigger member having a spring retaining surface internally of said bushing supporting means, said bushing supporting means having internally a cooperative spring retaining surface, the invention further including a compression supporting spring disposed between said surfaces in a manner to urge said trigger member radially outwardly in the direction toward its said actuator surface, said trigger means further including stop means for permitting radial movement of said trigger member between first and second positions, said trigger member being apertured to (1) receive axially slidingly said alignment shaft means when said compression supporting spring is compressed by radially inward movement of said actuator surface to said first position, and (2) block the axial motion of said alignment shaft means when said trigger member is disposed at said second position.

5. The invention according to claim 4 in which said cocking shaft means includes a hollow cylindrical tube which enclosed said return spring and which is apertured to form a pair of elongated, diametrically opposed axial slots through which is disposed said trigger member.

6. The invention according to claim 5 which further includes a trigger member housing sleeve carried by said bushing supporting means and which is transversely apertured to pass said alignment shaft means, said housing sleeve being disposed slidingly within said axial slots of said cocking shaft means.

7. Solder removal apparatus comprising:
hollow cylindrical body member having first and second ends;
tip member disposed removably within said first end and including an axially outwardly extending solder drawing tube portion;
bushing housing body disposed in said second end and being centrally apertured;
piston assembly disposed at least predominantly within said cylindrical body member axially between said first and second ends and including piston member and alignment rod member affixed thereto and extending coaxially therefrom toward and at least partially through said centrally apertured second end;
energy storage means coupled to said piston assembly against which work is done in moving said piston assembly toward said first end;
externally extending cocking plunger means axially movable inwardly responsive to an externally applied hand force and being disposed through said second end and engageable against said piston assembly for forcefully displacing said assembly toward said first end against said energy storage means;
externally releasable trigger means carried by said body member in cooperative association with said piston assembly for holding it time selectively in an axial position toward said first end against said energy storage means; and
return means coupled to said cocking plunger means for moving said cocking plunger means axially outwardly while said trigger means holds said piston toward said first end.

References Cited by the Examiner

UNITED STATES PATENTS 2,491,165 12/1949 De Rugeris.
2,960,591 10/1958 Brillinger.
3,114,026 12/1963 Fortune.

JOHN F. CAMPBELL, *Primary Examiner.*

WHITMORE A. WILTZ, *Examiner.*

M. L. FAIGUS, *Assistant Examiner.*